United States Patent [19]

Liu

[11] Patent Number: 6,015,971
[45] Date of Patent: Jan. 18, 2000

[54] OPTICAL SENSING SYSTEM USING POSITIONING HOLES FOR ENCODING

[75] Inventor: Shu-Ming Liu, Taipei, Taiwan

[73] Assignee: Primax Electonics, Ltd., Taiwan

[21] Appl. No.: 08/984,376

[22] Filed: Dec. 3, 1997

[30] Foreign Application Priority Data

Oct. 9, 1997 [CH] Switzerland ............... 86114883

[51] Int. Cl.$^7$ ............................................. G01D 5/34
[52] U.S. Cl. ............................. 250/231.13; 250/231.18
[58] Field of Search ..................... 250/231.13, 231.14, 250/231.18, 231.17; 341/13; 356/373, 375

[56] References Cited

U.S. PATENT DOCUMENTS

| 4,988,865 | 1/1991 | Schmidt et al. | 250/231.18 |
| 5,729,007 | 3/1998 | Taniguchi et al. | 250/231.18 |

*Primary Examiner*—Edward P. Westin
*Assistant Examiner*—Kevin Pyo
*Attorney, Agent, or Firm*—Winston Hsu

[57] ABSTRACT

The present invention discloses an optical sensing system which uses a plurality of positioning holes to identify the positions of corresponding encoding holes so that an encoding signal can be accurately generated according to each detected positioning hole and all the corresponding encoding holes. The optical sensing system comprises an optical panel having a plurality of encoding holes and positioning holes, a sensing device for detecting movements of the optical panel related to the sensing device, and a control circuit connected to the sensing device. The sensing device comprises a light source for emitting light to the optical panel, a first light detector for detecting the light transmitted through the positioning holes and a second light detector for detecting the light transmitted through the encoding holes. The control circuit converts an output of the second light detector into an encoding signal when one of the positioning holes is detected by the first light detector. The relative positions of the positioning holes and the encoding holes over the optical panel are arranged according to the positions of the first and second light detectors so that for each of the positioning holes detected by the first light detector, all the corresponding encoding holes of the detected positioning hole are clearly detected in the same time by the second light detector.

5 Claims, 4 Drawing Sheets

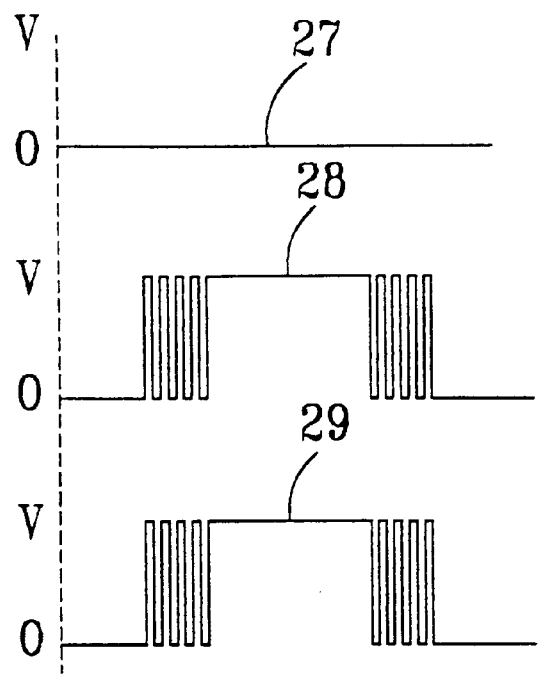
FIG. 3 *Prior art*
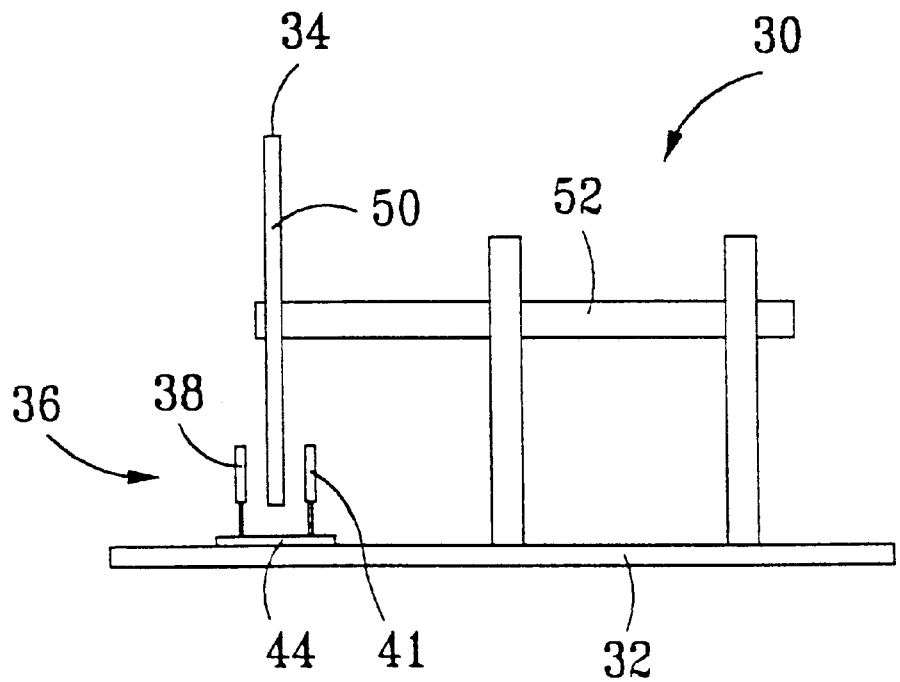
FIG. 4

OPTICAL SENSING SYSTEM USING POSITIONING HOLES FOR ENCODING

BACKGROUND OF THE INVENTION

1. Field of the Invention

The present invention relates to an optical sensing system, and more particularly, to an optical sensing system using positioning holes and encoding holes to generate encoding signals.

2. Description of the Prior Art

Please refer to FIG. 1 and FIG.2. FIG.1 is a side view of a prior art optical sensing system 10. FIG. 2 is a front view of the optical panel 14 shown in FIG. 1. The optical sensing system 10 comprises a chassis 12, a wheel-shaped optical panel 14, and a sensing device 16. The optical panel 14 is rotatably mounted on the chassis 12. It comprises a plurality of encoding holes 24 circularly installed around the periphery of the optical panel 14. The sensing device 16 is installed on the chassis 12 for detecting rotations of the optical panel 14. It comprises a printed circuit board 22, a light source 18 installed on the board 22 for emitting light to the optical panel 14, and a light detector 20 installed on the board 22 which comprises three sensors 19a, 19b and 19c for detecting the light emitted from the light source 18 and transmitted through the encoding holes 24.

Please refer to FIG. 3. FIG. 3 is a timing diagram of three output signals 27, 28, 29 generated by the three sensors 19a, 19b and 19c when the encoding hole 25 of the optical panel 14 shown in FIG. 2 passing across the light detector 20. The timing diagram clearly shows that when the front and rear edges of the encoding hole 25 passing across the light source 18, the sensors 19b and 19c of the light detector 20 generate jitters at the front and rear ends of the output signals 28 and 29. It is because the front and rear edges of the encoding hole 25 will interfere with the light transmitted through the encoding hole 25 and cause instability over the light received by the sensors 19b and 19c of the light detector 20. Since the encoding hole 25 is used for identifying a specific position of the optical panel 14, the jitters existed in the output signals 28 and 29 make it difficult to judge the position of the optical panel 14.

SUMMARY OF THE INVENTION

It is therefore a primary objective of the present invention to provide an optical sensing system which can solve the above mentioned problem.

In a preferred embodiment, the present invention provides an optical sensing system comprising:

- an optical panel comprising a plurality of encoding holes and positioning holes;
- a sensing device for detecting movements of the optical panel related to the sensing device, the sensing device comprising a light source for emitting light to the optical panel, a first light detector for detecting the light transmitted through the positioning holes and a second light detector for detecting the light transmitted through the encoding holes and generating an output to indicate the detected encoding holes accordingly; and
- a control circuit connected to the sensing device for converting the output of the second light detector into an encoding signal when one of the positioning holes is detected by the first light detector;
- wherein the relative positions of the positioning holes and the encoding holes over the optical panel are arranged according to the positions of the first and second light detectors so that for each of the positioning holes detected by the first light detector, a predetermined number of corresponding encoding holes of the detected positioning hole are clearly detected in the same time by the second light detector.

It is an advantage of the present invention that the optical sensing system uses positioning holes to identify various positions of the optical panel and for each of the positioning holes detected by the first light detector, a predetermined number of corresponding encoding holes of the detected positioning hole are clearly detected in the same time by the second light detector so that the encoding signal can be accurately generated by the control circuit according to the output of the second light detector.

These and other objectives of the present invention will no doubt become obvious to those of ordinary skill in the art after reading the following detailed description of the preferred embodiment which is illustrated in the various figures and drawings.

BRIEF DESCRIPTION OF THE DRAWINGS

FIG. 3 is a timing diagram of the output signals generated by light detector shown in FIG. 1

FIG. 4 is a side view of an optical sensing system according to the present invention.

DETAILED DESCRIPTION OF THE PREFERRED EMBODIMENT

Figure 1:
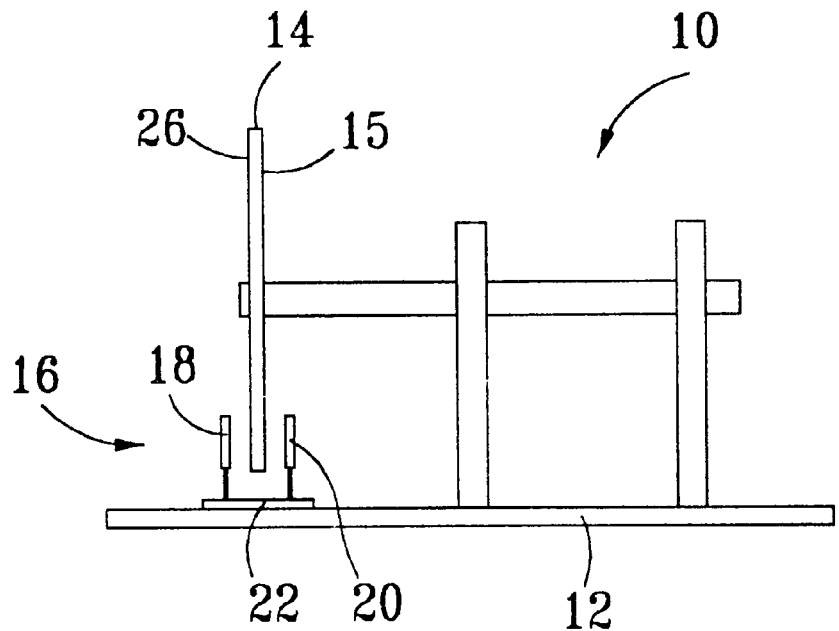
FIG. 1 is a side view of a prior art optical sensing system.
Figure 2:
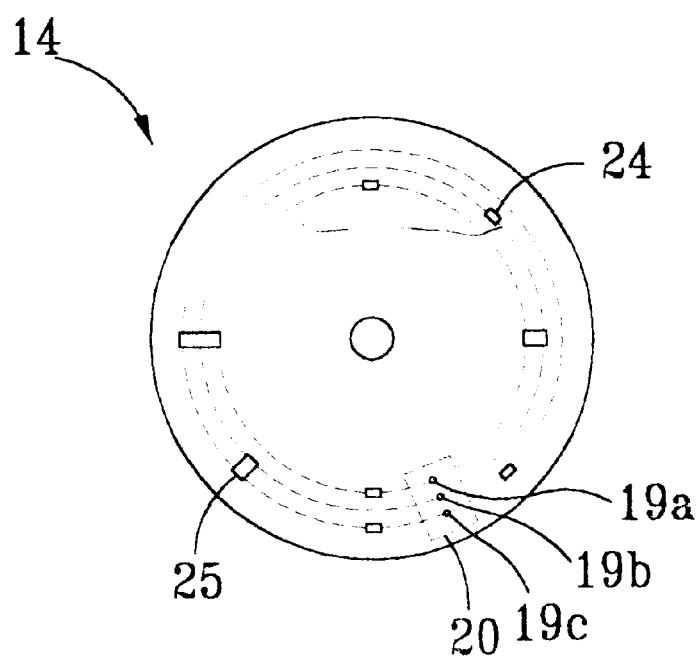
FIG. 2 is a front view of the optical panel shown in FIG. 1.
Figure 5:
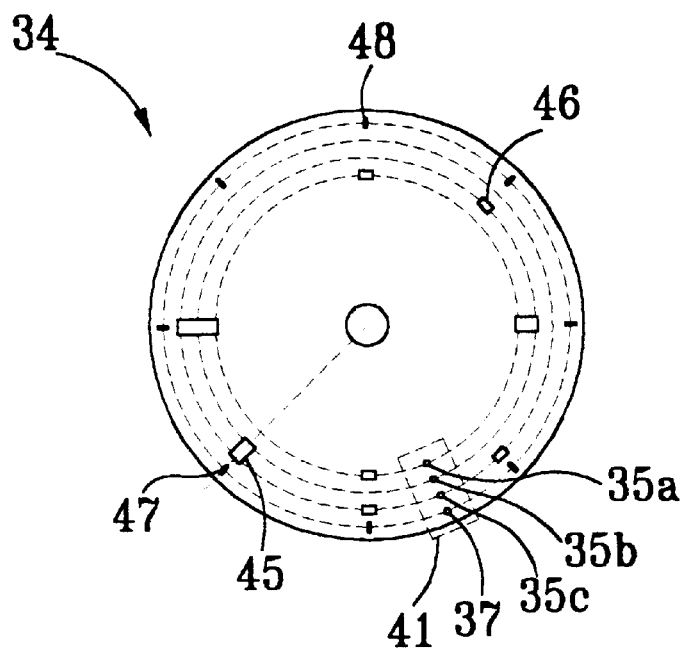
FIG. 5 is a front view of the optical panel shown in FIG. 4.
Figure 6:
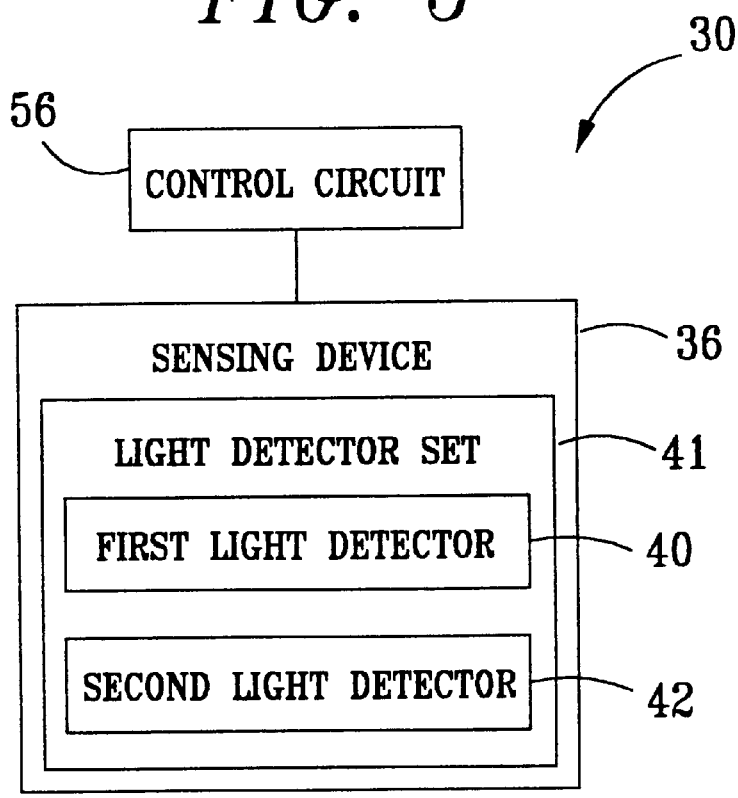
FIG. 6 is a function block diagram of the optical sensing system shown in FIG. 4.

Please refer to FIG. 4 to FIG. 6. FIG. 4 is a side view of an optical sensing system 30 according to the present invention. FIG. 5 is a front view of the optical panel 34 shown in FIG. 4. FIG. 6 is a function block diagram of the optical sensing system 30 shown in FIG. 4. The optical sensing system 30 comprises a chassis 32, a wheel-shaped optical panel 34 rotatably installed on the chassis 32, sensing device 36 installed on the chassis 32 next to the optical panel 34 for detecting rotations of the optical panel 34, and a control circuit 56 wired to the sensing device 36.

The optical panel 34 comprises a wheel-shaped plate 50 and an axle 52 perpendicularly installed at the center of the wheel-shaped plate 50. The axle 52 of the optical panel is rotatably mounted to the chassis 32. The optical panel 34 further comprises a plurality of encoding holes 46 and positioning holes 48 circularly arranged around the periphery of the optical panel 34. The positioning holes 48 are circularly arranged along an outer track of the optical panel 34, and the encoding holes 46 are circularly arranged along three inner tracks of the optical panel 34. The positioning holes 48 are used to mark various positions of the optical panels 34, and the encoding holes 46 are used to identify each position marked by a position hole 48.

The sensing device 36 is used for detecting movements of the optical panel 34 related to the sensing device 36. It comprises a printed circuit board 44, a light source 38 installed on the board 44 for emitting light to the optical panel 34, and a light detector set 41 installed on the board 44 for receiving the light emitted from the light source 38. The light detector set 41 comprises a first light detector 40 for detecting the light transmitted through the positioning holes 48 and a second light detector 42 for detecting the light transmitted through the encoding holes 46 and generating correspondent output signals to indicate the detected encoding holes 46 accordingly. The first light detector 40 comprises one sensor 37 for detecting the positioning holes 48 along the outer track of the optical panel 34. The second light detector 42 comprises three sensors 35a, 35b and 35c for detecting the encoding holes 46 along the three inner tracks of the optical panel 34.

The sensors of the first and second light detectors 40 and 42 are linearly arranged along a diameter direction of the wheel-shaped plate 50 for detecting the positioning holes 48 and encoding holes 46 separately. Each of the positioning holes 48 and its corresponding encoding holes 46 are also linearly arranged along a diameter direction of the wheel-shaped plate 50. The relative positions of the positioning holes 48 and the encoding holes 46 over the optical panel 34 are arranged according to the positions of the first and second light detectors 40 and 42 so that for each of the positioning holes 48 detected by the first light detector 40, a predetermined number of corresponding encoding holes 46 of the detected positioning hole 48 are detected in the same time by the second light detector 42 and the position marked by the detected positioning hole 48 is identified according to the output of the second light detector 42 according to the corresponding encoding holes 46.

In order to avoid jitters in the output signals of the second light detector 42, the size of each of the positioning holes 48 is made smaller than the size of each of the encoding holes 46 so that when each positioning hole 48 is detected by the first light detector 40, the three sensors 35a, 35b and 35c of the second light detector 42 will be located at exactly the centers of all the corresponding encoding holes 46 so that all the corresponding encoding holes 46 can be clearly detected in the same time by the second light detector 42 with no jitters produced.

The control circuit 56 is used for converting the output signals generated by the second light detector 42 into an encoding signal when each of the positioning holes 46 is detected by the first light detector 40. When the optical panel 34 is rotated, each of the positioning holes 48 will sequentially pass across the first light detector 40 and all the corresponding encoding holes 46 of each positioning hole 48 will be converted into an encoding signal by the control circuit 56. The encoding signal is used to identify the position marked by the detected positioning hole 48.

Figure 7:
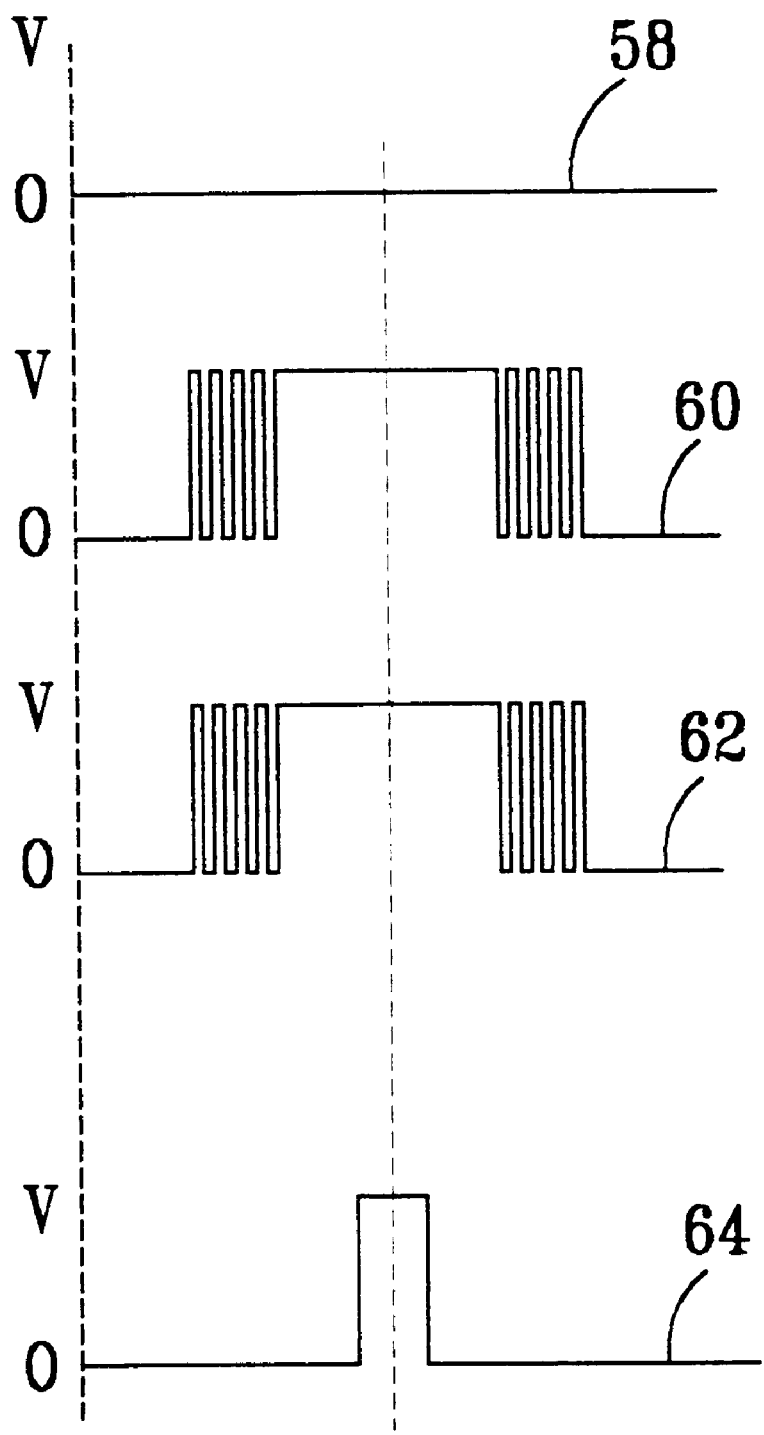
FIG. 7 is a timing diagram of the output signals generated by the light detector shown in FIG. 4.

Please refer to FIG. 7. FIG. 7 is a timing diagram of the output signals generated by the light detector set 41 shown in FIG. 4 when the positioning hole 47 and its corresponding encoding hole 45 are detected. The three sensors 35a, 35b and 35c of the second light detector 42 and the sensor 37 of the first light detector 40 will generate the four corresponding output signals 58, 60, 62 and 64. During the period when the positioning hole 47 is detected by the first light detector 40, the two sensors 35b and 35c of the second light detector 42 will clearly detect the corresponding encoding hole 45 in the same time with no jitters produced. This is because the size of the positioning hole 47 is smaller than the corresponding encoding hole 45 so that the front and rear edges of the encoding hole 45 will not interfere with the light transmitted through the encoding hole 45 when the positioning hole 47 is being detected by the first light detector 40.

The positioning hole 47 itself may produce jitters at the front and rear ends of its output signal 64 when the positioning hole 47 is being detected by the first light detector 40. But since all the encoding signals which may possibly generated by the output signal 64 of the positioning hole 47 will be identical, the jitters over the output signal 64 will cause no problem in identifying the position marked by the positioning hole 47.

Those skilled in the art will readily observe that numerous modifications and alternations of the device may be made while retaining the teachings of the invention. Accordingly, the above disclosure should be constructed as limited only by the metes and bounds of the appended claims.

What is claimed is:

1. An optical sensing system comprising:

an optical panel comprising a plurality of encoding holes and positioning holes;

a sensing device for detecting movements of the optical panel related to the sensing device, the sensing device comprising a light source for emitting light to the optical panel, a first light detector for detecting the light transmitted through the positioning holes and a second light detector for detecting the light transmitted through the encoding holes and generating an output to indicate the detected encoding holes accordingly; and a control circuit connected to the sensing device for converting the output of the second light detector into an encoding signal when one of the positioning holes is detected by the first light detector;

wherein the relative positions of the positioning holes and the encoding holes over the optical panel are arranged according to the positions of the first and second light detectors and the size of each of the positioning holes is smaller than the size of each of the encoding holes, so that for each of the positioning holes detected by the first light detector, a predetermined number of corresponding encoding holes of the detected positioning hole are clearly detected in the same time by the second light detector.

2. The optical sensing system of claim 1 further comprising a chassis wherein the optical panel is rotatably installed in the chassis, and the sensing device is installed in the chassis next to the optical panel for detecting rotations of the optical panel.

3. The optical sensing system of claim 2, the optical panel comprising a wheel-shaped plate and an axle perpendicularly installed at the center of the wheel-shaped plate wherein the axle of the optical panel is rotatably mounted to the chassis.

4. The optical sensing system of claim 3 wherein the positioning holes and the encoding holes are circularly arranged around the periphery of the plate.

5. The optical sensing system of claim 4 wherein the first and second light detectors arranged along a diameter direction of the wheel-shaped plate for detecting the positioning and encoding holes.

* * * * *